Figure 1:
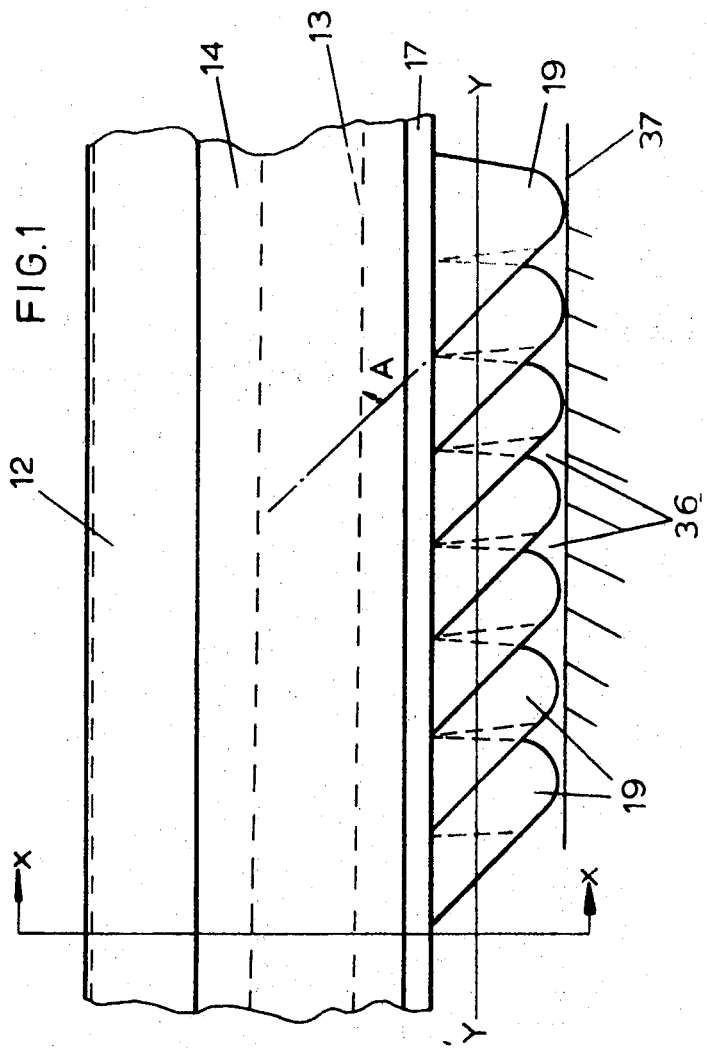

United States Patent [19]
Wheeler et al.

[11] 3,770,079
[45] Nov. 6, 1973

[54] FLEXIBLE SKIRT ASSEMBLIES FOR AIR CUSHION VEHICLES

[75] Inventors: Raymond Leslie Wheeler, East Cowes; John Henry, Cowes, both of England

[73] Assignee: British Hovercraft Corporation Limited, Yeovil, Somerset, England

[22] Filed: Feb. 9, 1972

[21] Appl. No.: 224,760

[30] Foreign Application Priority Data
Feb. 16, 1971 Great Britain...................... 4,761/71

[52] U.S. Cl. .............................................. 180/127
[51] Int. Cl. ............................................... B60v 1/16
[58] Field of Search.................... 180/116, 117, 123, 180/127

[56] References Cited
UNITED STATES PATENTS
3,502,168  3/1970  Jones .................................. 180/127
3,297,102  1/1967  Cockerell............................ 180/127
3,420,330  1/1969  Bliss..................................... 180/123

Primary Examiner—Gerald M. Forlenza
Assistant Examiner—D. W. Keen
Attorney—Roberts B. Larson et al.

[57] ABSTRACT

An air cushion vehicle has a flexible skirt assembly which includes a plurality of independent flexible segments. Each segment has an outer part which is arcuate in plan view with the concave surface thereof positioned for facing the cushion and two webs projecting one from each side of the arcuate part into the cushion. Those segments which are positioned beneath the longitudinal sides of the vehicle are formed and fitted so as to project rearwardly and downwardly, and so that their webs project rearwardly into the cushion at an angle to the longitudinal axis of the vehicle.

6 Claims, 6 Drawing Figures

FLEXIBLE SKIRT ASSEMBLIES FOR AIR CUSHION VEHICLES

This invention concerns skirt assemblies for air cushion vehicles, and is more particularly concerned with skirt assemblies which include segments.

British Pat. No. 952,722 discloses a skirt which is of corrugated form in plan view, the laterally outermost parts of the skirt being caused to be relatively resistant to buckling so far as compressive forces on these parts in the up and down direction are concerned, whilst the innermost parts of the skirt are caused to be relatively prone to buckling as far as compressive forces on these parts in the up and down direction are concerned. The outer parts of the corrugations are arcuate in plan view with the concave surfaces thereof positioned for facing the cushion, and two upright webs extend from opposite sides, one from each, of the outer parts, to project into the cushions. The webs of adjacent corrugations may or may not be secured together.

In operation it has been found more beneficial for the webs of adjacent corrugations not to be joined together as this allows obstacles to pass between the corrugations. These individual corrugations have become known in the art as "segments" or "fingers," and will be referred to as "segments" throughout this specification.

We have found that when these segments are positioned along the longitudinal sides of the vehicle with their webs projecting into the cushion substantially perpendicular to the longitudinal axis of the vehicle they have two major disadvantages. Firstly, since an air cushion vehicle seldom operates on a true forward heading but nearly always has a sideways component of motion, the segments on one side of the vehicle are in part concave towards the direction of motion, and scoop up water. On a large vehicle the number of segments along the longitudinal sides of the vehicle is considerable, and scooping can give rise to very high drag loads. Secondly, in order to withstand the high rate of wear at the lowermost tip of the segment, the material from which it is constructed must be substantial. Therefore, when the segment is inflated by the cushion pressure it becomes a very stiff member which does not buckle and flex easily. However, the segments along the sides of the vehicle are continuously subjected to wave impact, and must flex to conform to the wave shape. Due to its high stiffness, a segment does not easily flex or buckle, hence the segment attachment points are subjected to high loads, giving rise to a high rate of failure at these points. The vehicle also receives high shock loads from the segments due to wave impact, and this reduces the passenger ride comfort.

To overcome scooping it has been proposed in British Pat. No. 1,215,372 that the segments on those parts of the skirt assembly which are substantially parallel to the longitudinal axis of the vehicle are arranged so that they are concave when viewed from the rear of the vehicle, the web portions of the segments extending rearwardly substantially parallel to the longitudinal axis of the vehicle. British Pat. No. 1,196,751 (U.S. Pat. No. 3,502,168) also includes a proposal for segments having an outer arcuate part and webs extending into the cushion area, wherein a projection of the line of each web is inclined at an angle other than normal to the longitudinal axis of the vehicle. Whilst this provides an answer to the problem of scooping it does not overcome the problem of the segment stiffness, in fact, when the webs of a segment project rearwardly it will be even more resistant to flexing, due to the forward motion of the vehicle.

According to the invention we provide a segment for an air cushion vehicle flexible skirt assembly, the segment having a developed shape and being provided with attachment means so that when it is attached beneath one of the longitudinal sides of an air cushion vehicle it projects rearwardly and downwardly and has two web portions which project rearwardly into the cushion area at an angle to the longitudinal axis of the vehicle.

In another form the invention consists in an air cushion vehicle having a flexible skirt assembly which includes an upper inflatable member attached to and depending from the vehicle, the skirt further including a plurality of segments attached to and projecting downwardly from the inflatable member, wherein the segments on those parts of the inflatable member which are substantially parallel to the longitudinal axis of the vehicle are arranged so that they project downwardly and rearwardly with respect to the vehicle, and have closed portions with web portions projecting therefrom into the cushion area with a rearward inclination so as to make an angle other than normal with the longitudinal axis of the vehicle.

Arranging the segments so that they project downwardly and rearwardly rather than vertically downwardly means that they are only subjected to bending loads by waves and obstacles encountered during forward movement of the vehicle, and they are more easily deflected to ride up over such waves and obstacles. If, however, they project rearwardly to such an extent that the acute angle formed between the web of a segment and the horizontal plane of the underside of the vehicle is too small, they lose their stiffness and will not function. On the other hand, if this angle is too great the segments will still be too stiff. We have found that the angle formed between a projection of either web of a segment and any horizontal on the vehicle should be in the range 35° to 55°, with the preferred angle being 45°.

Similarly, with the webs of the segments projecting rearwardly into the cushion area at an angle to the longitudinal axis of the vehicle. If the acute angle formed between the projection of a web and the longitudinal axis of the vehicle is too small, the cross-section of the segment becomes too stiff in bending and the segment does not flex easily. On the other hand if this angle is large, too great an area of the open side of the segment will be presented towards the general direction of motion of the vehicle, with consequent scooping and high drag loads. We have found that the acute angle formed between a projection of a web of the segment and the longitudinal axis of the vehicle should be in the range 61° to 81°, with a preferred angle of 71°.

Figure 2:
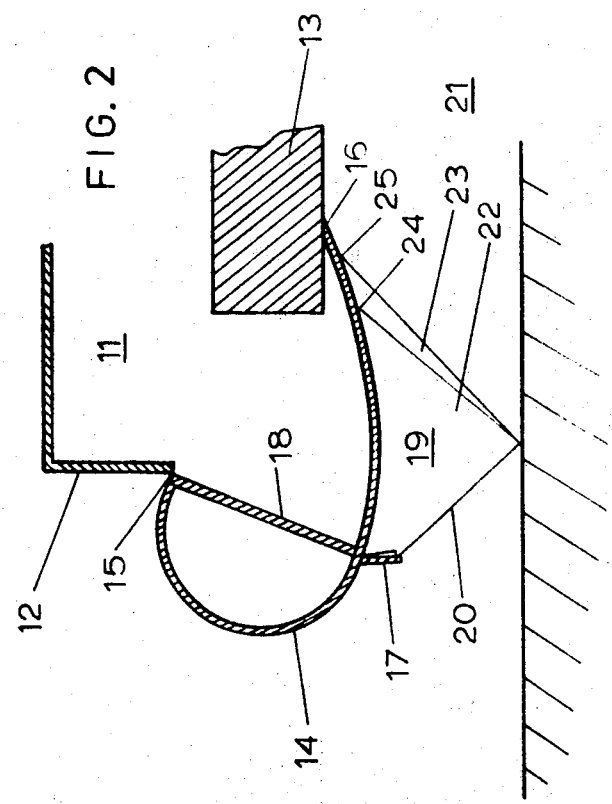
Figure 3:
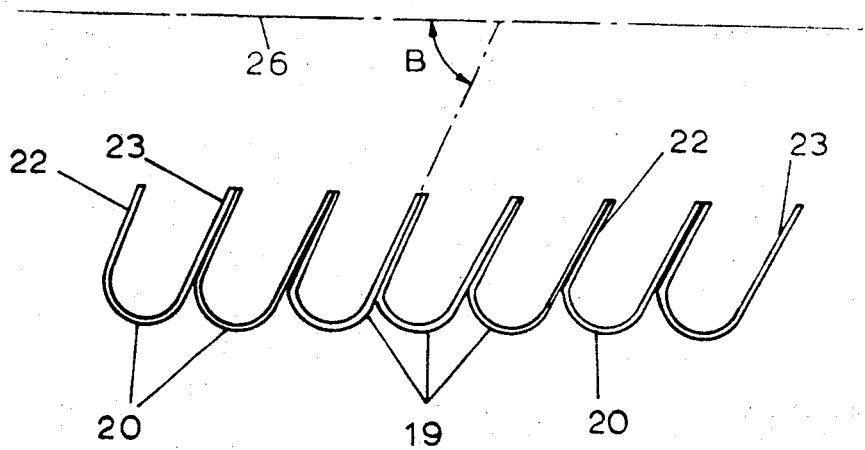
Figure 4:
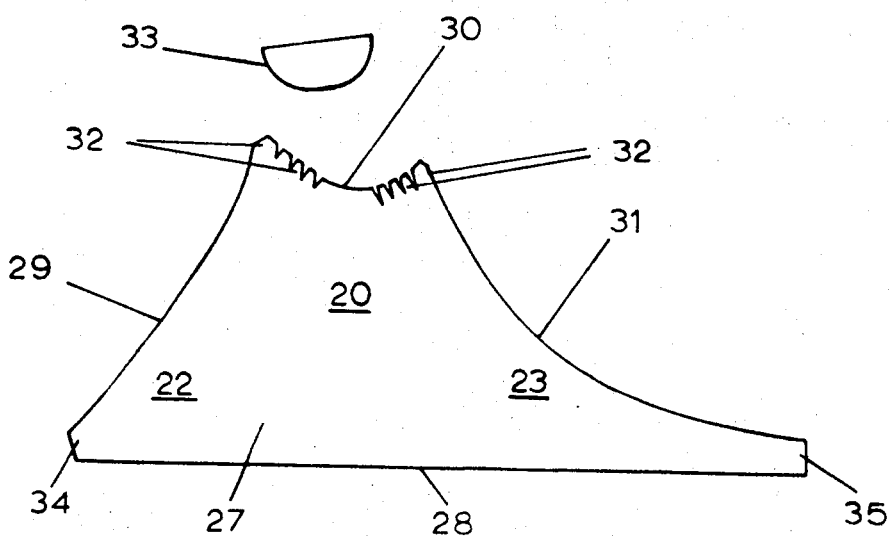
Figure 5:
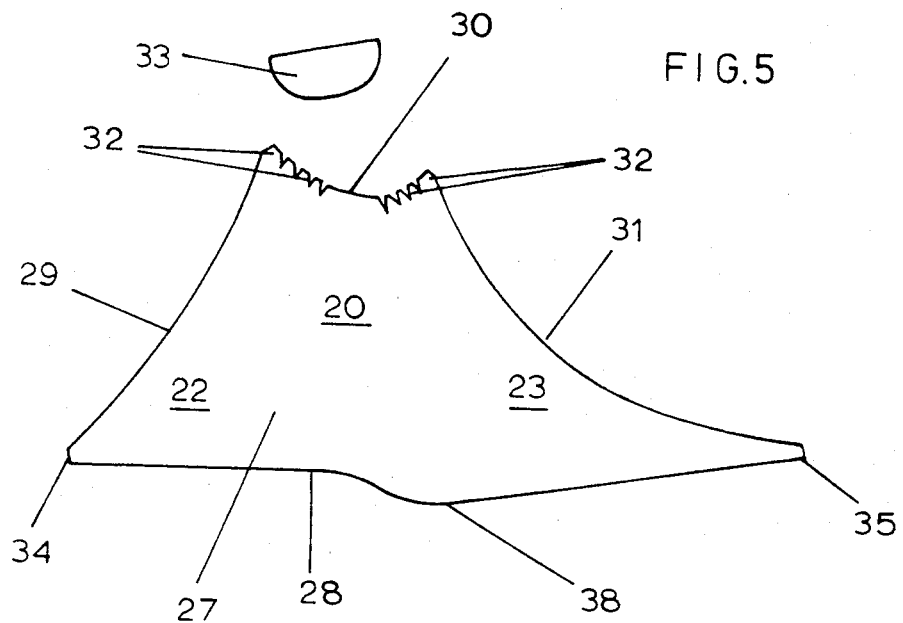
Figure 6:
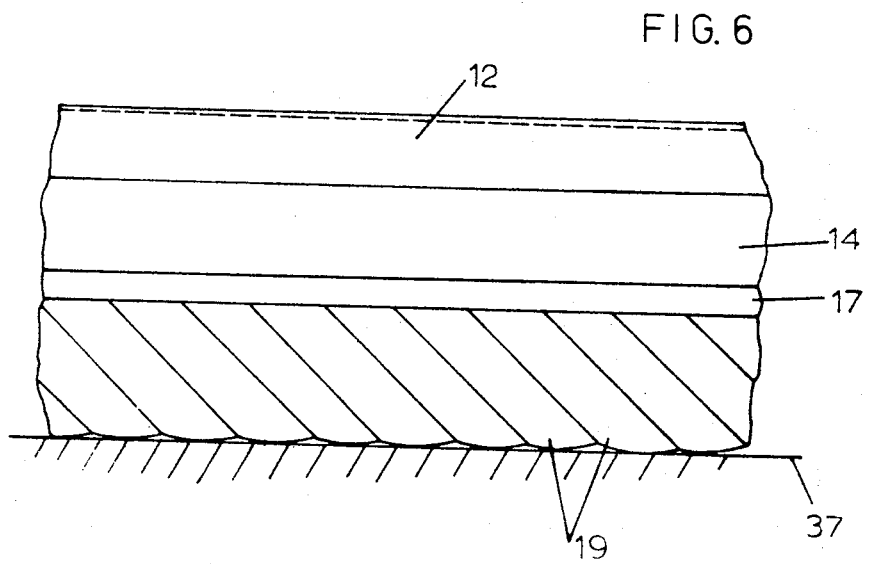

One embodiment of the invention will now be described with reference to the accompanying drawings, in which:

FIG. 1 shows part of one of the longitudinal sides of an air cushion vehicle having a flexible skirt assembly including segments in accordance with the present invention, FIG. 2 is a section on X—X of FIG. 1, FIG. 3 is a section through the segments on line Y—Y of FIG. 1, FIG. 4 shows the developed shape of two pieces of material which may be used to make up a segment similar to those shown in FIG. 1, FIG. 5 shows the preferred developed shape of the material for making a segment, and FIG. 6 shows part of one longitudinal side of a vehicle fitted with segments made from material cut to the developed shape shown in FIG. 5.

Referring first to FIGS. 1 and 2 of the accompanying drawings, FIG. 1 shows part of one of the longitudinal sides of an air cushion vehicle with the flexible skirt assembly depending therefrom, and FIG. 2 is a section through the rigid structure of the vehicle and the flexible skirt on line X—X of FIG. 1. A duct 11 is formed between outer rigid structure 12 and the buoyancy tank 13 of the vehicle, and pressurised air from one or more lift fans (not shown) positioned on the vehicle flows through the duct 11 to inflate the flexible member 14. The flexible member 14 extends along at least the side of the vehicle and has one edge attached by suitable means (not shown) such as lacing or piano hinges to the rigid structure 12 along an attachment line 15, whilst its opposite edge is attached by similar means (not shown) along an attachment line 16 to the buoyancy tank 13. An apron 17, which may be an integral part of the flexible member 14 or may be formed by a strip of flexible material having one edge attached to the outer surface of the flexible member 14 by suitable means such as rivetting or bonding, depends downwardly from the flexible member 14. A tie member 18 is provided inside the flexible member 14.

A plurality of segments 19 projects downwardly and rearwardly from the inflated flexible member 14. Each segment has an arcuate part 20 which is concave to the air cushion area 21, as is best seen in FIG. 3. Two webs 22 and 23 project rearwardly, one from each side of the arcuate part 20, into the air cushion area 21. The top of the arcuate part 20 of each segment 19 is attached to the apron 17 by suitable releasable fastening means such as bolts, lacing, or shackles and chains (not shown). Those parts of the webs 22 and 23 which project furthest into the air cushion area 21 are attached to the flexible member 14 by similar suitable releasable fastening means (not shown) at attachment points 24 and 25 respectively. Alternatively, these attachment points 24 and 25 could be on the buoyancy tank 13.

The segments are arranged in this manner on those parts of the inflatable flexible member 14 which are parallel to the longitudinal axis of the vehicle. The segments 19 project downwardly and rearwardly so that a line projected from one of the webs of the segment makes an acute angle A with any horizontal plane on the vehicle such as the underside of the buoyancy tank 13. In order that the segment when inflated by pressurised air from the cushion area 21 shall not be too stiff but will bend under the forces applied at the lowermost part of the segment by irregularities in the surface over which the vehicle is travelling, the angle A should not be greater than 55°. On the other hand, in order that the segment shall have sufficient stiffness to return to its extended position after deflection and not lie flat against the underside of the flexible member 14, the angle A should not be smaller than 35°. We have found the preferred value for angle A to be 45°.

The webs 22 and 23 of the segments 19 also project into the cushion area with a rearward component so that an inward projection of any of the webs makes an acute angle B with the longitudinal axis 26 of the vehicle, as seen in FIG. 3. As the angle B becomes smaller, the webs 22, 23, approach a position in which they are parallel to the longitudinal axis 26 of the vehicle and the arcuate part 20 is concave when viewed from the rear of the vehicle. This presents a stiffer section to the bending loads applied at the lowermost part of the segment by irregularities in the surface over which the vehicle is operating, and, in order that the segment shall not become too stiff, the angle B should not be smaller than 61°. At the same time, in order that too great an area of the open side of the segments on one side of the vehicle shall not be presented to the direction of motion when the vehicle is travelling forwards with a yawing moment, which would result in high drag loads due to scooping, the angle B should not be greater than 81°. The preferred value for angle B is 71°.

FIG. 4 shows the developed shape of two pieces of flexible material which can be used to make a segment according to the invention. The larger of the two sheets 27 of flexible material has one substantially straight edge 28 and three curved edges 29, 30 and 31. A series of tabs 32 are formed in the curved edge 30, and these are fixed in a suitable manner, such as bonding, to the smaller sheet 33 of flexible material.

The segment is formed by bending the two corners 34 and 35, formed by the intersection of the curved edge 29 and straight edge 28, and the curved edge 31 and straight edge 28 respectively, backwards in the same direction. The central part of sheet 27 between the curved edge 30 and straight edge 28 then becomes the arcuate part 20 of the segment. That part of the sheet 27 between the curved edge 29 and the straight edge 28 becomes the forward web 22 of the segment, and that part of the sheet 27 between the curved edge 31 and the straight edge 28 becomes the rear web 23 of the segment.

When the segment is fixed in position beneath the flexible member 14, as shown in FIG. 1, it projects downwardly and rearwardly and the two webs 22 and 23 project rearwardly into the cushion area. The edges 29 and 31 match the curvature of the flexible member 14. In order to withstand the very high loads which are put on the attachment points during operation it is preferable to attach the segment to the flexible member 14 along substantially the whole length of the edges 29, 30 and 31. This may be done by bolting the edges 29 and 31 to downwardly depending tabs provided on the flexible member 14, and bolting the edge 30 to the apron 17.

When segments of this type are fitted to the vehicle as shown in FIG. 1 large gaps 36 are left between the segments and the surface 37 over which the vehicle is operating. These gaps 36 allow air to escape from the cushion and can be avoided by cutting the large sheet 27 to the developed shape shown in FIG. 5.

FIG. 5 shows the preferred developed shape for the large sheet 27, the edge 28 being shaped to give it an additional portion 38. When the material is folded to form a segment and fitted to the flexible member 14, as previously described in relation to FIG. 4, the gaps 36 are filled in by the portions 38, and the bottom edge of the skirt formed by the segments is very nearly a straight edge, as shown in FIG. 6.

Unfortunately at the present time the material from which the segments are cut is restricted in the width which is available, and the segments for large air cushion vehicles cannot be cut from this material in a single piece if they have the shaped edge. It is preferable that they should be cut from a single piece of material to avoid bonded joints, which are a constant source of weakness and failure. Therefore, such segments for large air cushion vehicles are cut to the shape shown in FIG. 4, whereas for the smaller size air cushion vehicles these segments are cut to the shape shown in FIG. 5.

It will be appreciated that the curvature of the edges 29 and 31 will depend upon the shape of the flexible member when inflated. If the segments are to be fitted direct to the underside of the rigid structure of the vehicle these edges would be straight.

We claim as our invention:

1. An air cushion vehicle having a flexible skirt assembly depending downwardly beneath at least a part of the length of each longitudinal side of the vehicle, said flexible skirt assembly comprising an upper inflatable member attached to the vehicle and a plurality of segments so constructed and attached to the upper inflatable member that in operation of the vehicle when the upper member is inflated each segment has an arcuate portion which is concave with respect to the air cushion and web portions which project one from either side of the arcuate portion into the air cushion with a rearward inclination so as to make an angle other than normal with the longitudinal axis of the vehicle, each segment as a whole also projecting downwardly and rearwardly at an angle to the vertical so that the lower edge of the arcuate portion trails the upper edge of the said arcuate portion.

2. An air cushion vehicle as claimed in claim 1, wherein the acute angle formed between either web of a segment which projects downwardly and rearwardly, and any horizontal plane on the vehicle, is within the range 35° to 55°.

3. An air cushion vehicle as claimed in claim 1, wherein the acute angle formed between a projection of either web of a segment having webs which project rearwardly into the cushion area, and the longitudinal axis of the vehicle, is within the range 61° to 81°.

4. An air cushion vehicle as claimed in claim 1, wherein the segments on the longitudinal sides of the vehicle are arranged so that the acute angle formed by a projection of either web of each segment and a horizontal plane on the vehicle is 45°, and the acute angle formed between a projection of either web of each segment and the longitudinal axis of the vehicle is 71°.

5. A flexible inflatable skirt assembly for attachment beneath at least part of the length of at least one of the longitudinal sides of an air cushion vehicle, said skirt assembly comprising a longitudinally extending flexible inflatable member arranged for attachment to the vehicle and a plurality of segments so constructed and attached to the inflatable member that in operation of the vehicle when the skirt assembly is inflated each segment has an arcuate portion which is concave with respect to the air cushion and web portions which project one from each side of the arcuate portion into the air cushion with a rearward inclination so as to make an angle other than normal with the longitudinal axis of the vehicle, each segment as a whole also projecting downwardly and rearwardly from the flexible inflatable member at an angle to the vertical so that the lower edge of the arcuate portion is displaced rearwardly with respect to the upper edge of said arcuate portion.

6. A segment as claimed in claim 5, wherein each skirt assembly is made from two pieces of flexible material, one piece being larger than the other, the larger piece having one substantially straight edge and three curved edges, a series of tabs being formed in the curved edge which is opposite the substantially straight edge, the tabs being fixed in a suitable manner to the smaller piece of material.

* * * * *